US012308536B2

(12) United States Patent
Tomita et al.

(10) Patent No.: US 12,308,536 B2
(45) Date of Patent: May 20, 2025

(54) CONNECTION DEVICE PROVIDING MULTIDIRECTIONAL CONTACTS

(71) Applicant: Panasonic Intellectual Property Management Co., Ltd., Osaka (JP)

(72) Inventors: Hironori Tomita, Nara (JP); Atsushi Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 372 days.

(21) Appl. No.: 17/999,601

(22) PCT Filed: Jun. 9, 2021

(86) PCT No.: PCT/JP2021/021821
§ 371 (c)(1),
(2) Date: Nov. 22, 2022

(87) PCT Pub. No.: WO2021/256332
PCT Pub. Date: Dec. 23, 2021

(65) Prior Publication Data

US 2023/0238722 A1 Jul. 27, 2023

(30) Foreign Application Priority Data

Jun. 17, 2020 (JP) ................................ 2020-104168

(51) Int. Cl.
*H01R 12/52* (2011.01)
*H01R 4/48* (2006.01)

(52) U.S. Cl.
CPC ............... *H01R 12/52* (2013.01); *H01R 4/48* (2013.01)

(58) Field of Classification Search
CPC ........... H01R 12/52; H01R 12/57; H01R 4/48
See application file for complete search history.

(56) References Cited

U.S. PATENT DOCUMENTS 3,960,434 A 6/1976 Soes
8,277,241 B2 * 10/2012 Horchler ................ H01R 24/84 439/74

(Continued)

FOREIGN PATENT DOCUMENTS

EP 3389145 A1 10/2018
JP 50-148893 A 11/1975
JP 4-141967 5/1992

OTHER PUBLICATIONS

International Search Report of PCT application No. PCT/JP2021/021821 dated Aug. 17, 2021.

(Continued)

*Primary Examiner* — Hae Moon Hyeon
(74) *Attorney, Agent, or Firm* — Rimon P.C.

(57) ABSTRACT

A connection device includes: a first substrate; a second substrate located above the first substrate; a protrusion provided on an upper surface of the first substrate and protruding from the first substrate toward the second substrate; a first terminal provided on the protrusion; and a second terminal provided on a lower surface of the second substrate and disposed opposite to the first terminal. The first terminal includes a first and second connector electrically joined together. The second terminal includes: a third connector that contacts the first connector; and a fourth connector that contacts the second connector, and the third and fourth connectors are electrically joined together. The third connector is located above the first connector. The second connector is located between a first side surface of the protrusion and the fourth connector. The third connector and fourth connectors have elasticity and press against the first connector and connector, respectively.

11 Claims, 2 Drawing Sheets

(56) References Cited

U.S. PATENT DOCUMENTS

| | | | | |
|---|---|---|---|---|
| 10,446,955 | B2 * | 10/2019 | Hoyack | H01R 13/6582 |
| 10,998,660 | B2 * | 5/2021 | Chen | H01R 13/11 |
| 2018/0301829 | A1 * | 10/2018 | Hoyack | H01R 13/658 |

OTHER PUBLICATIONS

The EPC Office Action dated Nov. 8, 2023 for the related European Patent Application No. 21827124.5.

* cited by examiner

CONNECTION DEVICE PROVIDING MULTIDIRECTIONAL CONTACTS

TECHNICAL FIELD

100011 The present disclosure relates to connection devices that are used in various electrical devices.

BACKGROUND ART

A conventional connection device will be described below. In the conventional connection device, a first terminal formed of an elastic conductor plate holds a second terminal so as to pinch the second terminal, and thus mutual connection between the first terminal and the second terminal is stabilized.

Note that Patent Literature (PTL) 1, for example, is known as related art document information pertaining to the present application.

CITATION LIST

Patent Literature

PTL 1: Unexamined Japanese Patent Publication No. H04-141967

SUMMARY OF THE INVENTION

In the conventional connection device, even when the conductor plate forming the first terminal has great elasticity, repeated application of force to the first terminal may make the state of mutual connection between the first terminal and the second terminal unstable. This means that in the conventional connection device, there is a risk that the reliability of connection between the first terminal and the second terminal may be reduced.

A connection device according to one aspect of the present disclosure includes: a first substrate; a second substrate located above the first substrate and disposed opposite to the first substrate; a protrusion provided on an upper surface of the first substrate and protruding from the first substrate toward the second substrate; a first terminal provided on the protrusion; and a second terminal provided on a lower surface of the second substrate and disposed opposite to the first terminal. The first terminal includes a first connector and a second connector, and the first connector and the second connector are electrically joined together. The second terminal includes: a third connector configured to contact the first connector; and a fourth connector configured to contact the second connector, and the third connector and the fourth connector are electrically joined together. The third connector is located above the first connector. The second connector is located between a first side surface of the protrusion and the fourth connector. The third connector has elasticity and is configured to press against the first connector. The fourth connector has elasticity and is configured to press against the second connector.

With the present disclosure, the state of connection between the terminals can be stabilized regardless of a direction in which a force is applied to the connection device.

DESCRIPTION OF EMBODIMENTS

Hereinafter, exemplary embodiments of the present disclosure will be described with reference to the drawings. Note that in the present disclosure, although description is made using terms indicating directions such as "up", "down", "right", "left", "front", and "back", these merely indicate relative positioning and do not limit the present disclosure.

Embodiment 1

Figure 1:
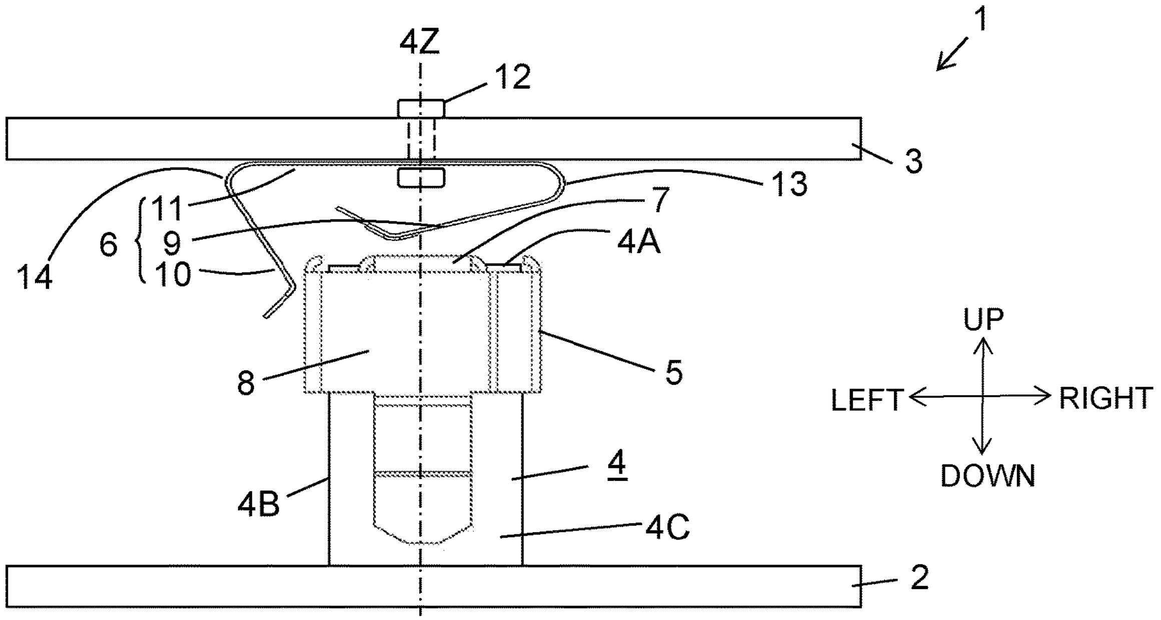
FIG. 1 is a side view illustrating the configuration of a connection device according to Embodiment 1 of the present disclosure.
Figure 2:
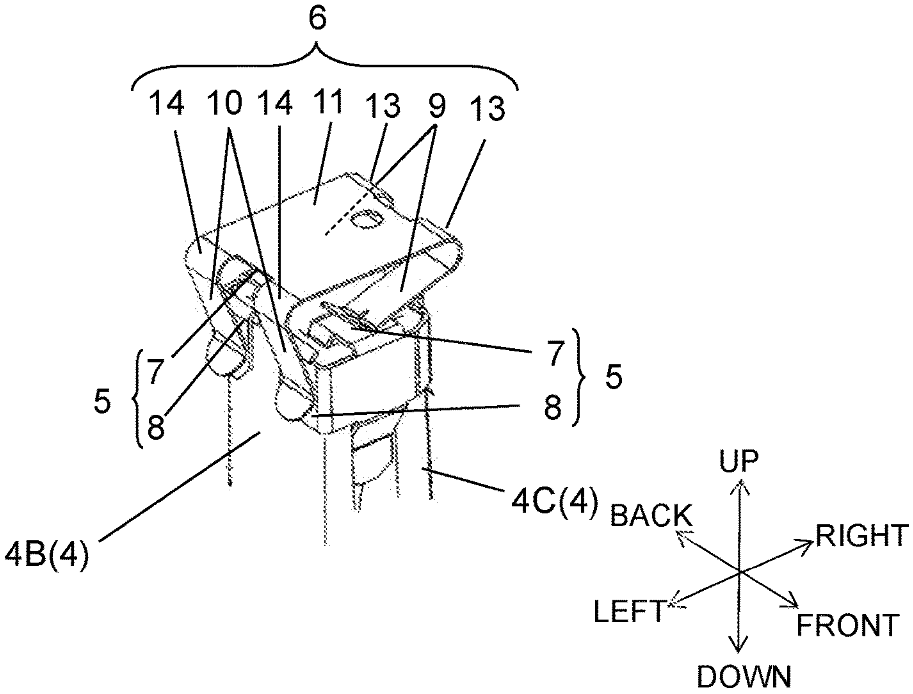
FIG. 2 is a perspective view illustrating a portion of a connection device according to Embodiment 1 of the present disclosure.

FIG. 1 is a side view illustrating the configuration of a connection device 1 according to Embodiment 1 of the present disclosure, and FIG. 2 is a perspective view illustrating a portion of the connection device 1 according to Embodiment 1 of the present disclosure.

Note that first connectors 7 and third connectors 9 are normally in contact with each other, but in FIG. 1, in order to facilitate understanding of the structure of each element, first connectors 7 and third connectors 9 are illustrated as being separated from each other. Similarly, second connector 8 and fourth connectors 10 are normally in contact with each other, but in FIG. 1, second connector 8 and fourth connectors 10 are illustrated as being separated from each other.

Figure 3:
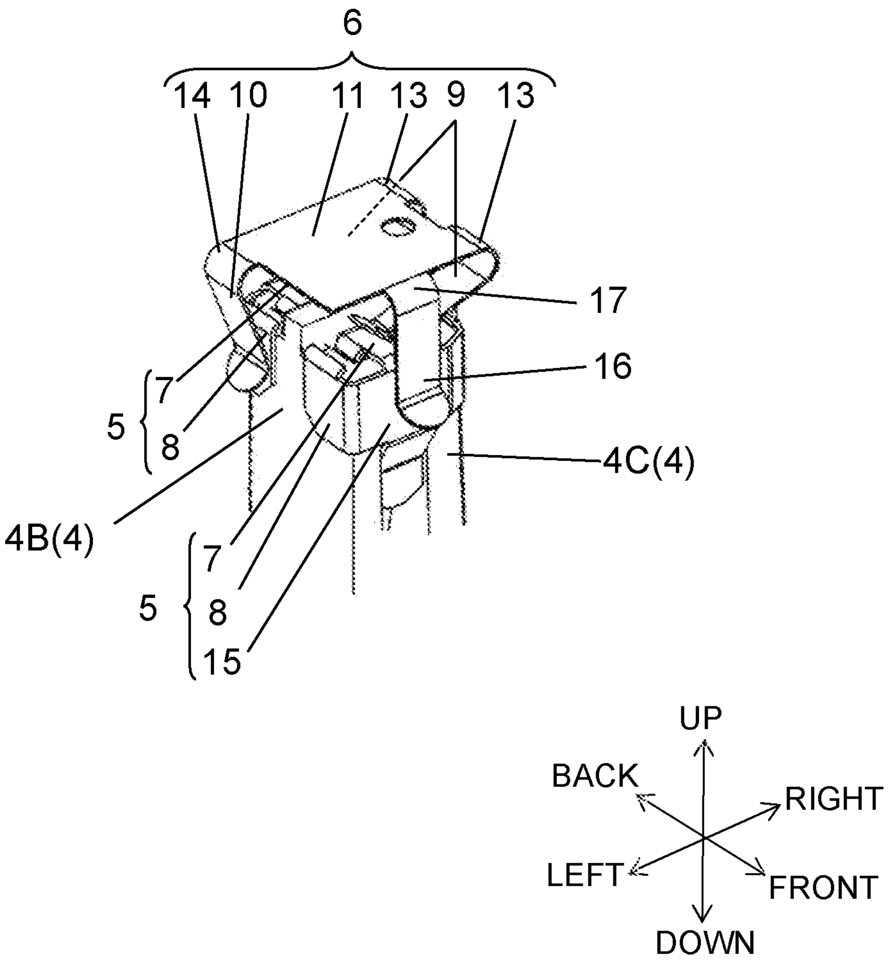
FIG. 3 is a perspective view illustrating a portion of a connection device according to Embodiment 2 of the present disclosure.

In FIG. 2 and FIG. 3 described later, illustration of first substrate 2 and second substrate 3 is omitted.

Connection device 1 includes first substrate 2, second substrate 3, protrusion 4, first terminal 5, and second terminal 6. First substrate 2 and second substrate 3 are opposite to each other. Protrusion 4 is provided on the upper surface of first substrate 2, and protrusion 4 protrudes from first substrate 2 toward second substrate 3. In the following description, the upper surface, the left side surface, and the front side surface of protrusion 4 are denoted as top surface 4A, side surface 4B (refer to FIG. 2), and side surface 4C (refer to FIG. 2), respectively, and the axis of protrusion 4 is denoted as axis 4Z, as illustrated in FIG. 1.

As illustrated in FIG. 2, first terminal 5 includes two first connectors 7 and second connector 8. Two first connectors 7 are joined together by second connector 8. First connectors 7 are disposed so as to contact top surface 4A which is the upper surface of protrusion 4. Second connector 8 is disposed so as to contact side surface 4B of protrusion 4.

Second terminal 6 includes two third connectors 9, two fourth connectors 10, and fifth connector 11. Two third connectors 9 and two fourth connectors 10 are joined together by fifth connector 11.

Note that in the present exemplary embodiment, two first connectors 7, two third connectors 9, and two fourth connectors 10 are provided, but the number of these to be provided does not necessarily need to be two; it is sufficient that at least one first connector 7, at least one third connector 9, and at least one connector 10 be provided.

As illustrated in FIG. 2, third connectors 9 contact first connectors 7, and fourth connectors 10 contact second connector 8.

Third connectors 9 have elasticity. Third connectors 9 press against first connectors 7. In the present disclosure, third connectors 9 press downward against first connectors 7.

Fourth connectors 10 have elasticity. Fourth connectors 10 press against second connector 8. In the present disclosure, fourth connectors 10 press rightward against second connector 8.

As described above, first terminal 5 and second terminal 6 are electrically connected to each other in a plurality of contact portions. More specifically, first terminal 5 and second terminal 6 are electrically connected in portions where third connectors 9 and first connectors 7 are in contact and portions where fourth connectors 10 and second connector 8 are in contact.

The force of contact between third connectors 9 and first connectors 7 is vertically exerted, and the force of contact between fourth connectors 10 and second connector 8 is horizontally exerted.

With this configuration, for example, when connection device 1 vibrates vertically with external force and force is applied to move first substrate 2 and second substrate 3 toward or away from each other, the state of contact between third connectors 9 and first connectors 7 becomes unstable. In contrast, the state of contact between fourth connectors 10 and second connector 8 is less susceptible to vertical force. The state of contact between fourth connectors 10 and second connector 8 is less likely to be affected by vertical vibration.

As another example, when connection device 1 vibrates horizontally, the state of contact between fourth connectors 10 and second connector 8 becomes unstable. In contrast, the state of contact between third connectors 9 and first connectors 7 is less susceptible to horizontal force. The state of connection between third connectors 9 and first connectors 7 is less likely to be affected by horizontal vibration.

In connection device 1 according to the present disclosure, even when significant force is applied to first substrate 2 and second substrate 3 and stress is concentrated on first terminal 5 and second terminal 6, at least one of the plurality of contact portions is less likely to be affected by external force.

Specifically, connection device 1 according to the present disclosure includes a plurality of portions where first terminal 5 and second terminal 6 contact each other. Furthermore, the plurality of portions where first terminal 5 and second terminal 6 contact each other include two or more contact portions where the direction in which first terminal 5 and second terminal 6 oppose each other is different. Thus, at least one of the plurality of contact portions is less likely to be affected by external force.

As is clear from the above description, connection device 1 according to the present disclosure is capable of maintaining high reliability of the state of contact between first terminal 5 and second terminal 6.

[Usage Example of Connection Device 1]

Next, a usage example of connection device 1 will be described with reference to FIG. 1 and FIG. 2. For example, with first terminal 5 and second terminal 6 being connected to each other, connection device 1 is used to supply electric power via connection device 1 from an external device (not illustrated in the drawings) to a device (not illustrated in the drawings) provided on first substrate 2.

As another example, with first terminal 5 and second terminal 6 being connected to each other, connection device 1 is used to supply electric power via connection device 1 from a device (not illustrated in the drawings) provided on first substrate 2 to an external device (not illustrated in the drawings).

[Details of Configurations of First Substrate 2 and Second Substrate 3]

The present disclosure describes first substrate 2 and second substrate 3 as each being in the form of a plate, as illustrated in FIG. 1, but the shape of first substrate 2 and second substrate 3 is not limited to this shape.

For example, first substrate 2 may be a substrate in the form of a base on which multiple devices are disposed. First substrate 2 does not necessarily need to be in the form of a plate and may be a casing. For example, second substrate 3 may be a casing, and second substrate 3 may be a lid that covers first substrate 2.

As another example, first substrate 2 and second substrate 3 may be mechanically connected. An example where first substrate 2 is a casing and second substrate 3 is a lid will be described. With first substrate 2, which is a casing, and second substrate 3, which is a lid, being mechanically connected to each other, second substrate 3 can be provided so as to be opened and closed like a door. In this case, the connection device is preferably configured such that when second substrate 3 as a door is closed, first terminal 5 provided on first substrate 2 and second terminal 6 provided on the second substrate are electrically connected.

Note that the fixing part for the first terminal is not illustrated in FIG. 1, but first terminal 5 and second terminal 6 are fixed to first substrate 2 and second substrate 3, respectively, using different fixing parts. Second terminal 6 is fixed to second substrate 3 using fixing part 12.

[Details of Configuration of Protrusion 4]

Next, the configuration of protrusion 4 will be described in detail.

In FIG. 1, protrusion 4 is provided on first substrate 2 and protrudes from first substrate 2 toward second substrate 3. In FIG. 1, protrusion 4 is an element different from first substrate 2, but first substrate 2 and protrusion 4 may be integrally formed. Furthermore, protrusion 4 does not necessarily need to be columnar. Protrusion 4 is desirably provided on first substrate 2 and formed into the shape of a column protruding from first substrate 2 toward second substrate 3. In the case where protrusion 4 is columnar, a rectangular column is preferred rather than a circular column. Second connector 8 of first terminal 5 is configured so as to surround side surfaces (such as side surface 4B and side surface 4C) of protrusion 4. Fourth connectors 10 of second terminal 6 contact second connector 8 of first terminal 5 and therefore, a surface of second contactor 8 that fourth connectors 10 contact is desirably flat rather than curved. Accordingly, side surface 4B of protrusion 4 on which second connector 8 is provided is desirably flat.

First connectors 7 are provided on top surface 4A of protrusion 4. Top surface 4A is a surface opposite to second substrate 3.

[Details of Configuration of Connection Device 1]

As illustrated in FIG. 1, second terminal 6 is provided on the lower surface of second substrate 3. Third connectors 9 and fourth connectors 10 are electrically joined together. Third connectors 9 contact first connectors 7, and fourth connectors 10 contact second connector 8. Note that in FIG. 1, in order to facilitate understanding of the structure, first connectors 7 and third connectors 9 are illustrated as being separated from each other, and second connector 8 and fourth connectors 10 are illustrated as being separated from each other.

As already described, third connectors 9 have elasticity. Third connectors 9 press against first connectors 7 along axis 4Z of protrusion 4, and third connectors 9 and first connectors 7 are in contact with each other.

Fourth connectors 10 have elasticity. Fourth connectors 10 press against second connector 8, and fourth connectors 10 and second connector 8 are normally in contact with each other. A direction in which fourth connectors 10 press against second connector 8 is orthogonal to axis 4Z of protrusion 4.

Second substrate 3 provided in the form of a plate, a sheet, or the like easily vibrates with external force, and the distance between first terminal 5 and second terminal 6 changes. Since third connectors 9 have elasticity, even when the positional relationship between first terminal 5 and the second terminal changes, the state of electrical connection between first terminal 5 and second terminal 6 can be maintained.

When connection device 1 vibrates vertically with external force and the distance between first terminal 5 and second terminal 6 changes rapidly, chattering may occur in the state where third connectors 9 and first connectors 7 are connected. When chattering occurs, the state of connection between third connectors 9 and first connectors 7 becomes unstable.

However, the direction in which fourth connectors 10 press against second connector 8 using elastic force is orthogonal to the direction of vibration, that is, the vertical direction. In the present disclosure, fourth connectors 10 press rightward against second connector 8. When vertical vibration occurs and the state of connection between third connectors 9 and first connectors 7 is unstable, positions at which fourth connectors 10 press against second connector 8 merely change vertically, and the state of electrical connection between fourth connectors 10 and second connector 8 is stable. In other words, even when the position of contact between fourth connectors 10 and second connector 8 changes vertically, fourth connectors 10 and second connector 8 rub against each other, merely causing a change in the position of contact; the electrical connection between fourth connectors 10 and second connector 8 is maintained.

Thus, high reliability of connection device 1 according to the present exemplary embodiment can be maintained.

Note that the length of second connector 8 in the vertical direction may be set to such a length that even with vertical vibration, fourth connectors 10 and second connector 8 can remain in contact with each other while rubbing against each other.

Third connectors 9 and fourth connectors 10 are each configured by bending a plate-shaped conductor. With this configuration, third connectors 9 are capable of generating elastic force to be used to press against first connectors 7. Similarly, fourth connectors 10 are capable of generating elastic force to be used to press against second connector 8.

As described above, second substrate 3 provided in the form of a plate, a sheet, or the like easily vibrates with external force, and a change in the distance between first terminal 5 and second terminal 6 in a direction (the vertical direction) in which axis 4Z of protrusion 4 extends is likely to be greater than a change in the distance between first terminal 5 and second terminal 6 in directions (such as the horizontal direction and the depth direction) orthogonal to axis 4Z.

For example, in the case where first substrate 2 is a casing and second substrate 3 is used as a lid, the lid is configured to be pushed, and vertical deformation easily occurs. Thus, a change in the vertical distance is likely to be greater than changes in the horizontal distance, the depth direction, etc.

For this reason, the amount of deformation of third connectors 9 pressing against first connectors 7 is preferably set greater than the amount of deformation of fourth connectors 10 pressing against second connector 8. Force applied by third connectors 9 pressing against first connectors 7 is preferably greater than force applied by fourth connectors 10 pressing against second connector 8.

As described above, second terminal 6, which includes third connectors 9 and fourth connectors 10, is disposed on second substrate 3, and third connectors 9 and fourth connectors 10 are electrically joined together. In order that third connectors 9 and fourth connectors 10 are electrically joined together, fifth connector 11 is provided as illustrated in FIG. 1. Second terminal 6 is connected to second substrate 3 at fifth connector 11 using fixing part 12.

As described above, third connectors 9 and fourth connectors 10 are electrically joined together. At the same time, the mechanical association between third connectors 9 and fourth connectors 10 is reduced at fifth connector 11 or fixing part 12 as a boundary. Specifically, stress generated by third connectors 9 pressing against first connectors 7 is less likely to propagate to fourth connectors 10. Stress generated by fourth connectors 10 pressing against second connector 8 is less likely to propagate to third connectors 9.

Therefore, even when the amount of deformation of third connectors 9 increases in the direction in which axis 4Z of protrusion 4 extends and when the deformation of third connectors 9 changes in a short period of time, third connectors 9 are kept from having an impact on fourth connectors 10. This results in less impact on the force of fourth connectors 10 pressing against second connector 8. This makes it possible to maintain increased reliability of the state of electrical connection between first terminal 5 and second terminal 6.

Second terminal 6 desirably includes third connectors 9, fourth connectors 10, and fifth connector 11 formed of a single conductor.

As illustrated in FIG. 1, first bends 13 are formed by being bent downward at right end portions of fifth connector 11 and being further bent. The portions located between third connectors 9 and fifth connector 11 correspond to first bends 13. The leading end of each of third connectors 9 bends so as to form an L shape. With this configuration, third connectors 9 have vertical elasticity.

As illustrated in FIG. 1, second bends 14 are formed by being bent downward at left end portions of fifth connector 11 and being further bent. The portions located between fourth connectors 10 and fifth connector 11 correspond to second bends 14. The leading end of each of fourth connectors 10 bends so as to form an L shape. With this configuration, third connectors 9 have horizontal elasticity.

Next, the configuration illustrated in FIG. 1 will be described differently.

Fifth connector 11 which is a portion of second terminal 6 and first connectors 7 each of which is a portion of first terminal 5 are generally opposite to each other. In order to allow third connectors 9 to exert great pressing force, first bends 13 are provided at the right end portions of fifth connector 11, and first bends 13 are provided between fifth connector 11 and third connectors 9. With this configuration, the right half of the conductor is shaped so that the right end is folded back to the left. The lower ends of third connectors 9 are located between fifth connector 11 and first connectors 7. As a result of fifth connector 11, third connectors 9, and first connectors 7 being positioned on the same axis, third connectors 9 have great pressing force.

Fourth connectors 10 have pressing force less than the pressing force of third connectors 9. Fourth connectors 10 are provided so as to connect to fifth connector 11 by second bends 14. Fourth connectors 10 are each roughly in an L shape. Second bends 14 are provided at the left end portions of fifth connector 11. With this configuration, the left half of the conductor is shaped so that the left end is folded back to the lower right.

As is clear from the above description, first terminal 5 and second terminal 6 contact each other vertically in some portions and horizontally in other portions.

Thus, in connection device 1 according to the present disclosure, first terminal 5 and second terminal 6 stably stay electrically connected to each other.

Note that natural frequency fz of the elasticity for obtaining vertical pressing force and natural frequency fy of the elasticity for obtaining horizontal pressing force preferably have different values. With different natural frequencies, even when connection device 1 vibrates and one of third connectors 9 and fourth connectors 10 resonates with the vibration of connection device 1, the other does not resonate with the vibration of connection device 1. Thus, it is possible to minimize the occurrence of situations in which both the state of contact of third connectors 9 and the state of contact of fourth connectors 10 become unstable at the same time.

The electrical connection between first terminal 5 and second terminal 6 is maintained by at least one of the contact between third connectors 9 and first connectors 7 and the contact between fourth connectors 10 and second connector 8. Thus, in connection device 1 according to the present disclosure, high reliability of the electrical connection between first terminal 5 and second terminal 6 can be maintained.

Note that the value of natural frequency fy of the elasticity for obtaining horizontal pressing force is desirably set greater than the value of natural frequency fz of the elasticity for obtaining vertical pressing force.

Generally, the natural frequencies are determined by the modulus of elasticity of third connectors 9 and the modulus of elasticity of fourth connectors 10. As mentioned earlier, second substrate 3 provided in the form of a plate, a sheet, or the like easily vibrates with external force. The amount of change in the distance between first terminal 5 and second terminal 6 in the direction (the vertical direction) in which axis 4Z of protrusion 4 extends is likely to be greater than the amount of change in the distance between first terminal 5 and second terminal 6 in the direction (the horizontal direction) orthogonal to axis 4Z. Therefore, third connectors 9 more easily deform than fourth connectors 10. Thus, third connectors 9 preferably have a smaller modulus of elasticity than the modulus of elasticity of fourth connectors 10. In other words, natural frequency fy of fourth connectors 10 pressing against second connector 8 is preferably set to have a value greater than the value of natural frequency fz of third connectors 9 pressing against first connectors 7. The sizes of first bends 13 and third connectors 9 are preferably set so as to maintain these relationships. The vertical size of connection device 1 can be arbitrarily set, and connection device 1 can also be made thin.

Furthermore, when substrate resonance frequency fb of first substrate 2 which easily vibrates vertically and natural frequency fz of the elasticity for obtaining vertical pressing force have different values, the present disclosure produces further improved advantageous effects.

Furthermore, in the case where two fourth connectors 10 are provided as illustrated in FIG. 2, when natural frequency fy1 of one of fourth connectors 10 and natural frequency fy2 of the other of fourth connectors 10 have different values, significant advantageous effects are produced. Similarly, in the case where two third connectors 9 are provided, when natural frequency fz1 of one of third connectors 9 and natural frequency fz2 of the other of fourth connectors 10 have different values, significant advantageous effects are produced.

Thus, the state of electrical connection between first terminal 5 and second terminal 6 is maintained by at least one of the four connectors, and the state of connection can be more reliable as compared to the case where the connectors are in two places.

The values of natural frequencies fy1, fy2 are desirably set greater than the values of natural frequencies fz1, fz2.

Note that the number of fourth connectors 10 and the number of third connectors 9 do not need to be one or two; three or more fourth connectors 10 may be provided, and three or more third connectors 9 may be provided. Even when three or more fourth connectors 10 or three or more third connectors 9 are provided, it is possible to achieve high reliability by making the natural frequencies of the connectors different.

Embodiment 2

Next, Embodiment 2 will be described with reference to FIG. 3. FIG. 3 is a perspective view illustrating a portion of a connection device according to Embodiment 2 of the present disclosure.

Note that elements that are substantially the same as those according to Embodiment 1 that have been described with reference to FIG. 2 are assigned the same reference marks and as such, description of the elements may be omitted.

The configuration according to Embodiment 1 that is illustrated in FIG. 2 and the configuration according to Embodiment 2 that is illustrated in FIG. 3 have the following differences.

In Embodiment 1 illustrated in FIG. 2, second terminal 6 includes two fourth connectors 10, but in Embodiment 2 illustrated in FIG. 3, second terminal 6 includes one fourth connector 10. Furthermore, in Embodiment 3, third bend 17 protruding from fifth connector 11 and seventh connector 16 extending from third bend 17 are provided.

The other elements are substantially the same as the elements according to Embodiment 1 that are illustrated in FIG. 2, and therefore are assigned the same reference marks and as such, description of the elements will be omitted.

As illustrated in FIG. 3, in first terminal 5, first connectors 7, second connector 8, and sixth connector 15 are electrically joined together. In second terminal 6, third connectors 9, fourth connector 10, and seventh connector 16 are electrically joined together. Third bend 17 is located between seventh connector 16 and fifth connector 11.

Seventh connector 16 contacts sixth connector 15 of first terminal 5. In connection device 1 illustrated in FIG. 3, second terminal 6 is formed of a single conductor. In the present embodiment, first terminal 5 is formed by bending a plate-shaped conductor.

Second terminal 6 includes fifth connector 11 electrically joined to each of third connectors 9, fourth connector 10, and seventh connector 16. It is preferable that third connectors 9, fourth connector 10, fifth connector 11, and seventh connector 16 have the same thickness.

As already described, first bends 13 are formed by bending the right end portions of fifth connector 11 downward and further bending the portions. Second bend 14 is formed by bending a left end portion of fifth connector 11 and further bending the portion. Third bend 17 is formed by being bent downward at a front end portion of fifth connector 11 and being further bent downward. The portion located between fourth connector 10 and fifth connector 11 corresponds to second bend 14. The leading end of fourth connector 10 bends so as to form an L shape. With this configuration, seventh connector 16 has depth-wise elasticity. The pressing force that seventh connector 16 exerts is smaller than the pressing force that third connectors 9 exert. It is sufficient that the pressing force that seventh connector 16 exerts be roughly the same as the pressing force that fourth connector 10 exerts.

Note that the elasticity of each connector can be set not only by the angle of the bend, but also by the width of the connector.

The reason why the connectors are configured to be different in the pressing force is that second substrate 3 provided in the form of a plate, a sheet, or the like easily vibrates with external force and the amount of change in the distance between first terminal 5 and second terminal 6 in the direction (the vertical direction) in which axis 4Z of protrusion 4 extends is likely to be greater than the amount of change in the distance between first terminal 5 and second terminal 6 in a direction orthogonal to axis 4Z.

The electrical connection between first terminal 5 and second terminal 6 can be secured by the vertical contact between first connectors 7 and third connectors 9, the horizontal contact between fourth connector 10 and second connector 8, and the depth-wise contact between seventh connector 16 and sixth connector 15.

With this configuration, the state of electrical connection between first terminal 5 and second terminal 6 can be maintained with high reliability regardless of the direction in which force is applied.

INDUSTRIAL APPLICABILITY

The connection device according to the present disclosure is advantageous in that the state of electrical connection between the terminals can be maintained with high reliability, and is useful in various electrical devices.

REFERENCE MARKS IN THE DRAWINGS

1 connection device
2 first substrate
3 second substrate
4 protrusion
4A top surface
4B side surface
4C side surface
4Z axis
5 first terminal
6 second terminal
7 first connector
8 second connector
9 third connector
10 fourth connector
11 fifth connector
12 fixing part
13 first bend
14 second bend
15 sixth connector
16 seventh connector
17 third bend

The invention claimed is:

1. A connection device comprising:
a first substrate;
a second substrate located above the first substrate and disposed opposite to the first substrate;
a protrusion provided on an upper surface of the first substrate and protruding from the first substrate toward the second substrate;
a first terminal provided on the protrusion; and
a second terminal provided on a lower surface of the second substrate and disposed opposite to the first terminal, wherein
the first terminal includes a first connector and a second connector, and the first connector and the second connector are electrically joined together,
the second terminal includes a third connector and a fourth connector, and the third connector and the fourth connector are electrically joined together, the third connector being configured to contact the first connector, the fourth connector being configured to contact the second connector,
the third connector is located above the first connector,
the second connector is located between a first side surface of the protrusion and the fourth connector,
the third connector has elasticity and is configured to press against the first connector, and
the fourth connector has elasticity and is configured to press against the second connector.

2. The connection device according to claim 1, wherein
a pressing force of the third connector against the first connector is greater than a pressing force of the fourth connector against the second connector.

3. The connection device according to claim 1, wherein
the second terminal further includes a fifth connector located between the third connector and the fourth connector, and
the second terminal is fixed to the second substrate at the fifth connector.

4. The connection device according to claim 3, wherein
the second terminal further includes a first bend and a second bend, the first bend being located between the third connector and the fifth connector, the second bend being located between the fourth connector and the fifth connector, and
the second terminal is formed of a single conductor.

5. The connection device according to claim 3, wherein
the first terminal further includes a sixth connector, and the sixth connector, the first connector, and the second connector are electrically joined together,
the second terminal further includes a seventh connector, and the seventh connector, the third connector, and the fourth connector are electrically joined together, the seventh connector being configured to contact the sixth connector,
the sixth connector is located between a second side surface of the protrusion and the seventh connector, and
the seventh connector has elasticity and is configured to press against the sixth connector.

6. The connection device according to claim 5, wherein
the second terminal further includes the seventh connector and a third bend located between the seventh connector and the fifth connector, and
the second terminal is formed of a single conductor.

7. The connection device according to claim 1, wherein a natural frequency of the third connector and a natural frequency of the fourth connector have different values.

8. The connection device according to claim 7, wherein the natural frequency of the third connector is smaller than the natural frequency of the fourth connector.

9. The connection device according to claim 1, wherein a modulus of elasticity of the third connector and a modulus of elasticity of the fourth connector have different values.

10. The connection device according to claim 9, wherein the modulus of elasticity of the third connector is smaller than the modulus of elasticity of the fourth connector.

11. The connection device according to claim 5, wherein a modulus of elasticity of the third connector is smaller than a modulus of elasticity of the seventh connector.

* * * * *